INVENTOR:
PAUL HALBIG
CARLO TADDEI
BY K. B. Mayr
ATTORNEY

UNITED STATES PATENT OFFICE 2,659,105

PROCESS FOR TEMPERING CURVED GLASSES OF ORGANIC MATERIALS

Paul Halbig and Carlo Taddei,
Fribourg, Switzerland

Application July 20, 1950, Serial No. 175,006

Claims priority, application Switzerland
July 20, 1949

1 Claim. (Cl. 18—47.5)

For shielding the faces of watches and similar indicating apparatus it has been preferred for some time to use unbreakable organic glass, especially glass consisting of polymethacrylate esters. Several years experience has revealed certain disadvantages of these organic glasses. One disadvantage is the sensitivity to organic solvents, such for example as the majority of esters, acetone, benzene, benzine, softeners, plastic material such as watch straps, and even to perspiration. Under the influence of these substances flaws and cracks are produced in the watch glass which not only spoil its appearance but in many cases may have very expensive consequences, for example in the case of so-called water-tight watches.

It has now been found that these disadvantages can simply be removed by subjecting the organic glass to a thermal treatment after its insertion in its frame, i. e. in the frame intended for it, for example a watch frame. It is essential only to heat the convex side, i. e. to bring the convex side momentarily to a higher temperature than the concave side. The concave side is meanwhile maintained for example at room temperature, for example by cooling with water, by blowing with cold air, or quite simply under the influence of the surrounding atmosphere, or else by application of a cold object of suitable form adapted to carry off heat. The treatment therefore preferably consists in heating the glass on the convex side to such temperatures that at least the immediate surface of the convex side reaches at least the softening point of the material of which the glass consists, whilst the heating should be such that the main mass of the glass remains below its softening temperature. The convex side is rapidy heated, the more rapidly the better, for example to 100° C. or more in the case of polymethylmethacrylate glasses. This may be effected by exposing the glass to hot air or the like. The time of treatment plays a decisive role. It can be the shorter the greater the difference is between the temperature of the glass and that of the heating medium. The treatment should in any case take place so quickly that the main mass of the glass remains below its softening temperature. If, for example, the concave side is cooled with cold air and the convex side is treated with paraffin oil at 200° C. 2–3 seconds suffice to give the desired effect. If water at 20–40° C. is used on the concave side and air at about 200° C. is used on the convex side, then about 10 seconds are necessary.

Air or hot combustion gas at 500° C. or more, also may be used with a corresponding shorter time of treatment of one second or less. The appropriate time can be determined in any particular case by previous experiments by rapidly quenching the treated glass and exposing it for a short time to solvents. Glasses which have not been treated or which have been incorrectly treated show the undesired flaws and cloudiness after a few seconds, whilst glasses which have been correctly treated are insensitive to such an experimental treatment. When the correct temperature difference and time of treatment, i. e. the appropriate conditions, have once been established by such experiments, the treatment can be carried out serially. The treatment may for example consist of inserting the glasses in their frames, whereupon flaws and cracking may occur, dipping the convex side of the glass for 2–3 seconds in oil at 250° C. and then immediately laying the glass in cold oil or water. Any small flaws produced by inserting the glass in its frame disappear upon thermal treatment. The treated glasses are distinguished by their increased clearness.

It has further been found that it is advantageous in the case of apparatus such as watches and similar measuring apparatus which must be enclosed in air- or water-tight frames, to insert a glass which is too large as such by choosing a glass of such a size that it can only be forced into the frame by over-stressing the material, which causes the glass to become grey or flawed. Such a glass cannot be used according to the process hitherto usual. These flaws may then be removed by heating the convex side according to the invention.

For example, in carrying out the process according to the invention the glass, after it has been forced under strain into the frame, is exposed for a short time, for example 1 second, to the flame of a small Bunsen burner, only the convex side being exposed to the flame. It is then preferably cooled immediately, for example by laying it in water. It is particularly advantageous to blow cold air onto the concave side at the same time as the convex side is passed through the flame. Glasses treated in this way are distinguished by increased imperviousness.

Comparative example

When a glass of polymethacrylic acid methyl ester of a diameter of 26.8 mm. is inserted in the usual way in a watch glass frame with a diameter at the groove of 26.4 mm. the glass itself shows no flaws, but if it is brought into contact with solvents or even with solvent vapours, it becomes matt and flawed after a few seconds. The glass can be pressed out of the frame by a load of 11.5 kg. applied to the concave side.

When, on the other hand, according to the invention, a glass of 27.2 mm. diameter is inserted into the same frame, it shows a gray shimmer in several places directly after insertion. When the glass disposed in the frame is thereupon passed through the flame of a small Bunsen burner, the period of dwell of the convex side in the flame amounting barely to a second, and is thereupon immediately cooled with cold water, then the glass is flawless after the treatment. The glass remains unchanged and retains its good appearance even on treatment with solvents in the manner above described. In order to force the glass out of the frame a load of 13.8 kg. must be applied to the concave side.

The process is suitable above all for tempering watch glasses. It may of course be applied to any other concavo-convex object of organic glass where it is desired to improve the surface. For example glasses for protective spectacles, optical lenses etc.

The drawing illustrates an embodiment of the invention.

Figure 1:
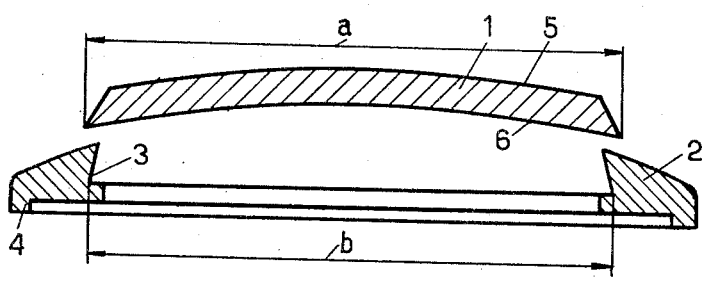
Fig. 1 is a transverse sectional view of the glass and its treating frame separated before the treatment.

As seen in Fig. 1, the diameter $a$ of the organic glass 1, which may serve as a watch crystal, is somewhat greater than the diameter $b$ of the seat provided in the treating frame 2. In a test case the diameter of the glass was 40 mm. and the diameter $b$ of the seat in the frame was less than 2/10 mm. smaller. The drawing exaggerates this difference.

The treating frame 2 has a receding groove 3 to form a seat from the glass and an annular rim for mounting the frame.

Figure 2:
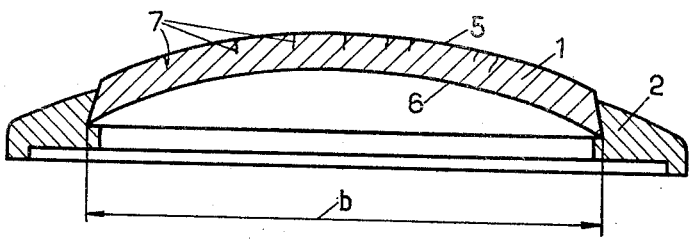
Fig. 2 is a transverse sectional view of the frame with the glass inserted thereinto.

For performing the process according to the invention, the diameter $a$ of the glass 1 is so much reduced by the application of a radial concentric pressure and by an elastic increase of the curvature of the glass that the rim of the glass can be inserted in the groove 3 of the treating frame 2. Thereupon the glass is released and occupies the position shown in Fig. 2 in which it assumes the smaller diameter $b$ of the seat in lieu of its original diameter $a$. The radius of the curvature of the glass inserted in the frame is smaller than that of the original and unrestricted glass shown in Fig. 1.

The increased curvature of the glass causes interior tension forces on the convex side 5 and pressure forces on the other side 6. The tension forces produce fine cracks 7 on the convex surface of the glass. These cracks are exaggerated in Fig. 2. They are actually very fine and hardly visible to the eye and may be manifested only by a dull or grey appearance of the convex top surface of the glass.

To remove these defects, the convex surface 5 of the glass which is in the frame 2 is subjected to a heat treatment by exposing it, for example for ten seconds, to a stream of air of 200° C. Thereupon the glass is cooled by immersion of the glass together with its frame in cold water.

Figure 3:
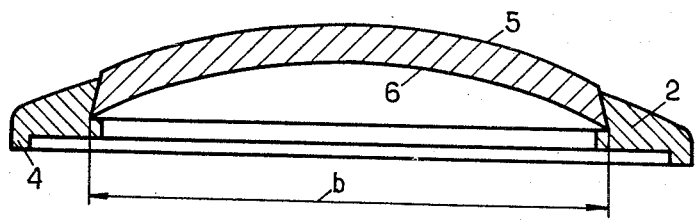
Fig. 3 is a view as Fig. 2 after completion of the treatment.

After this treatment the glass shown in Fig. 3 assumes its original appearance, its convex surface 5 again being without cracks. The glass may now be removed from the frame unless the latter is the frame in which the glass is used. If the glass is removed from the frame, it returns to the configuration shown in Fig. 1 whose curvature is less than that of the glass in the frame. The heated glass may be inserted in a frame in which it is used and whose diameter is somewhat smaller, the seat of the last mentioned frame having a diameter $b$ which is equal to that of the seat of the treating frame. Due to the previous treatment no defects, such as the cracks 7, will occur so that the appearance of the glass inserted in its final frame is without flaw, the convex surface 5 having increased resistance to mechanical and chemical abuses.

What we claim is:

A process of tempering a curved transparent sheetlike organic material destined for ultimate use in curved form at normal temperatures, including, in combination, the steps of pressing opposed marginal portions of the material toward each other to increase the curvature of the material until the convex surface of the material becomes flawed, and of heating the convex surface of the material until the convex surface becomes flawless.

PAUL HALBIG.
CARLO TADDEI.

References Cited in the file of this patent

UNITED STATES PATENTS

| Number | Name | Date |
|---|---|---|
| 1,344,700 | Loomis | June 29, 1920 |
| 2,313,851 | Van Deventer | Mar. 16, 1943 |
| 2,328,065 | Dreyfus | Aug. 31, 1943 |
| 2,402,221 | Wiley | June 18, 1946 |
| 2,514,088 | Pinsky | July 4, 1950 |

OTHER REFERENCES

Plexiglas Fabricating Manual, Rohm and Haas Co., Washington Square, Philadelphia, Pa., 9th Ed., 1945, page 13.